United States Patent
Nguyen et al.

[19]

[11] Patent Number: 5,867,676
[45] Date of Patent: Feb. 2, 1999

[54] RESET CIRCUIT FOR A PERIPHERAL COMPONENT INTERCONNECT BUS

[75] Inventors: Vincent Nguyen, Sugarland; Paul V. Brownell, Houston, both of Tex.

[73] Assignee: Compaq Computer Corp., Houston, Tex.

[21] Appl. No.: 699,918

[22] Filed: Aug. 20, 1996

[51] Int. Cl.$^6$ .................................................. G06F 13/00
[52] U.S. Cl. ........................................... 395/309; 395/306
[58] Field of Search ..................................... 395/306–309

[56] References Cited

U.S. PATENT DOCUMENTS

| | | | |
|---|---|---|---|
| 5,446,403 | 8/1995 | Witkowski | 327/143 |
| 5,608,877 | 3/1997 | Sung et al. | 395/284 |
| 5,623,691 | 4/1997 | Clohset et al. | 395/821 |
| 5,627,962 | 5/1997 | Goodrum et al. | 395/182.11 |
| 5,657,455 | 8/1997 | Gates et al. | 395/280 |
| 5,675,794 | 10/1997 | Meredith | 395/651 |

FOREIGN PATENT DOCUMENTS 0 158 512 A  10/1985  European Pat. Off. .

OTHER PUBLICATIONS

"60x Bus–to–PCI Bridge" *IBM Technical Disclosure Bulletin;* vol. 38, No. 5, May 1995, New York, U.S.; pp. 401–102.

Shanley & Anderson: "PCI System Architecture", Nov. 1995, Addison–Wesley, Amsterdam, NL *p. 440, paragraph 5—p. 441, paragraph 1: figures 19–19*.

Article: Andrews, Warren; "Computer Design"; vol. 31; No. 8; Aug. 1992; pp. 42–45.

Article: Davy, Tom; "Intel's Natoma offers better performance for NT"; PC Week OnLine; May 3, 1996; pp. 1–3.

*Primary Examiner*—Meng-Ai T. An
*Assistant Examiner*—Sumati Lefkowitz
*Attorney, Agent, or Firm*—Jenkens & Gilchrist

[57] ABSTRACT

A reset circuit for a computer system having PCI chip set, the reset circuit for resetting a PCI data bus in the event of a warm boot in the computer system to prevent corrupt data files, the reset circuit including a logical AND gate with a first input connected to a cold boot reset pin of the PMC, and an output connected to a PCI data bus; a logical OR gate with a first input connected to the flush pin of the PMC and an output connected to a second input of the logical AND gate; an inverter with an input connected to the flush pin of the PMC; and a delay device connected between an output of the inverter and a second input of the logical OR gate.

17 Claims, 2 Drawing Sheets

5,867,676

RESET CIRCUIT FOR A PERIPHERAL COMPONENT INTERCONNECT BUS

FIELD OF THE INVENTION

The present invention relates to reset circuits for computer systems utilizing a peripheral component interconnect (PCI) environment. More specifically, the present invention relates to a reset circuit for resetting a PCI bus within a computer system.

BACKGROUND OF THE INVENTION

Many existing computer systems utilize the peripheral component interconnect (PCI) technology. PCI is a high-speed system bus specification that provides 32-bit or 64-bit data paths at 33 MHz or 66 MHz clock rates, depending upon the chip sets used.

The PCI bus is a system bus that can be populated with adapters requiring fast access to memory or each other. The PCI bus is a bus-mastered architecture. A bus-mastered approach allows for a single bus master which controls the bus and generally a single target device for any given transaction. One advantage of the PCI bus over other technologies is that the length of a burst transfer is negotiated by master and target rather than limited to a finite number of words.

The PCI bus uses burst mode to read and write data to and from adapters. Data is transferred every clock cycle, as opposed to very other clock cycle as is the case in some other bus designs. The PCI bus can provide up to 132 Mbits/sec performance during burst mode operation for 32-bit systems, and up to 264 Mbits/sec performance during burst mode operation for 64-bit systems.

The PCI bus is configured so that it is not directly connected to the processor and memory. The reason for this is that bus designs that are wired directly to the processor are limited in the number of devices they can support, usually three. The PCI bus however can support up to ten or more devices.

In normal use, a PCI host bridge (or bus controller chip or module) is connected between the central processing unit (CPU) and the PCI busses. Among other things, the bridge acts as a buffer between the CPU and the PCI busses and also maintains the PCI bus in synch with the CPU.

A problem encountered with certain PCI chip sets occurs when a user attempts to assert a warm boot on the computer system. In particular, when a warm boot is generated, for example by entering Ctrl-Alt-Delete, certain PCI chip sets, such as the Intel 440FX PCIset, do not generate a warm boot signal. Because of this, when a warm boot occurs, the data that is already in the PCI registers and buffers does not reset, but rather continues to be transferred to and from the destination port. This can lead to corrupt data files.

SUMMARY OF THE INVENTION

The present invention overcomes the above identified problems as well as other shortcomings and deficiencies of existing technologies by providing a PCI reset circuit that resets the PCI bus in response to the assertion of a warm boot command, either by hardware, software, or the user of the computer system.

The present invention further provides a computer system having a host data bus; a peripheral component interconnect (PCI) data bus; a PCI host bridge connected between the host data bus and the PCI data bus, which is for interfacing data between the host data bus and the PCI data bus, and a reset circuit connected between the PCI host bridge and the PCI data bus for resetting the PCI data bus in the event of a warm boot in the computer system. The reset circuit includes a delay device and programmable array logic.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
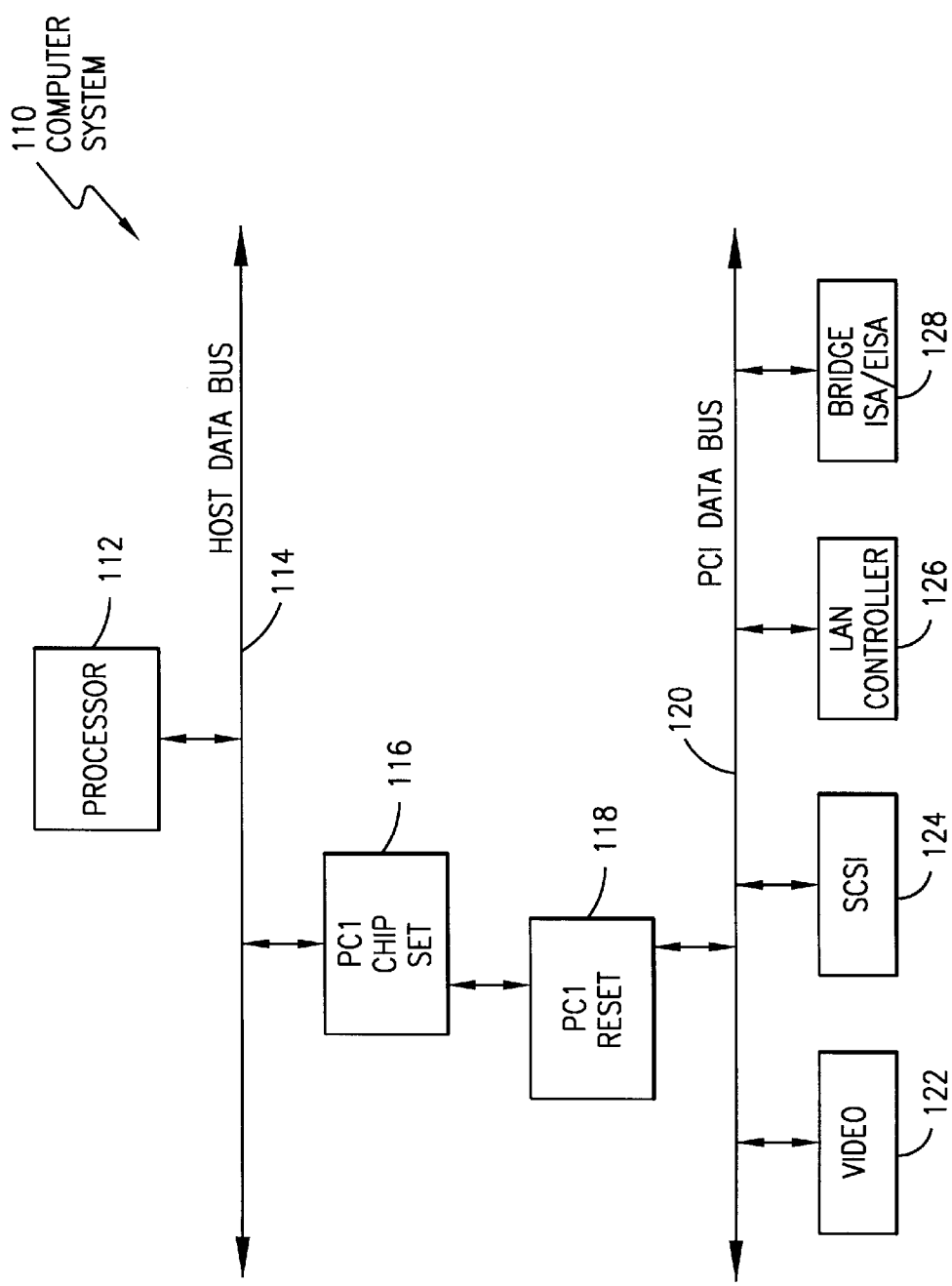
FIG. 1 is a block diagram illustrating a system utilizing the present invention.

Referring now to FIG. 1, there is shown a block diagram illustrating a computer system 110 utilizing the present invention therein. As depicted the computer system 110 includes a processor 112, a host data bus 114, a peripheral component interface (PCI) chip set 116, a PCI reset 118, a PCI data bus 120 and multiple input/outputs such as video I/O 122, SCSI 124, LAN controller 126 and ISA/EISA bridge 128.

As depicted processor 112 and PCI chip set 116 are connected to host data bus 114, while PCI reset 118 is connected between PCI chip set 116 and PCI data bus 120. PCI data bus 120 is in turn connected to various input/output (I/O) ports such as the ports of video I/O 122, SCSI 124, LAN controller 126 and ISA/EISA bridge 128.

Both PCI data bus 120 and host data bus 114 generally consist of a control line, an address line and a data line.

Regarding PCI chip set 116, good results have been achieved using the PCI reset 118 with an Intel 440FX PCIset. The Intel 440FX PCIset generally includes a PCI & memory controller (PMC) chip (the 82441FX PMC), a data bus accelerator (DBX) chip (the 8244FX DBX), and a PCI ISA IDE Accelerator chip (the PIIX3). However it is contemplated to be within the scope of this invention that appropriate variations of the PCI reset could be used with other PCI chip sets.

Although computer system 110 is depicted as utilizing a single processor, it is also contemplated that multiple processors could be used.

Figure 2:
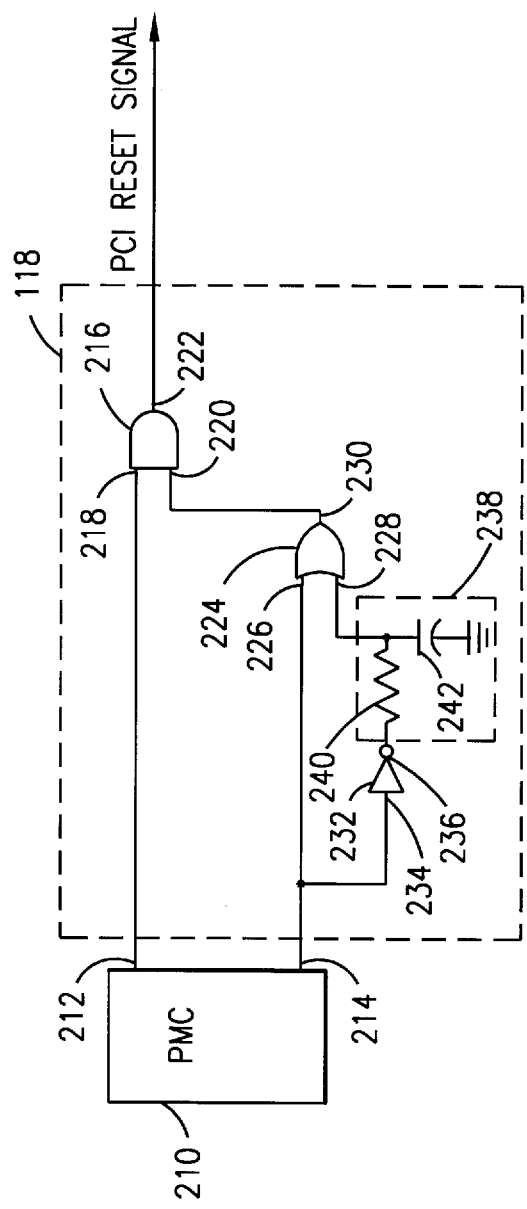
FIG. 2 is a more detailed block diagram illustrating the reset circuit shown in FIG. 1.

Referring now to FIG. 2, there is shown a more detailed drawing of PCI reset 118 of the present invention. As depicted in this embodiment, PCI reset 118 is connected to PMC 210, which as described above, is one of the chips utilized by PCI chip set 116. PMC 210 includes signal outputs 212 and 214, where output 212 generates the cold boot PMC/PCI reset signal and output 214 generates a flush signal.

As further illustrated in FIG. 2, PCI reset 118 includes a logical AND gate 216, a logical OR gate 224, an inverter 232, and a delay device 238. AND gate 216 includes inputs 218 and 220 and an output 222. Output 222 is connected to PCI data bus 120 and outputs the PCI reset signal. The input 218 of AND gate 216 is connected to output 212 of PMC 210.

OR gate 224 includes inputs 226 and 228 and an output 230. Output 230 of OR gate 224 is connected to input 220 of AND gate 216. Input 226 of OR gate 224 is connected to output 214 of PMC 210.

Inverter 232 includes an input 234 and an output 236. Input 234 of inverter 232 is connected to output 214 of PMC 210. As further illustrated, delay device 238 includes a resistor 240, and a capacitor 242, with resistor 240 connected between output 236 of inverter 232 and input 228 of OR gate 224 and capacitor 242 connected between a potential (illustrated as ground) and input 228 of OR gate 224. The values of resistor 240 and capacitor 242 will vary depending upon the desired delay. Although good results have been achieved with the above described delay device, it is contemplated that other delay devices could be utilized in the present invention by one skilled in the art.

The operation of PCI reset 118 will now be discussed in detail. In the initial or normal operating state, the cold boot PCI/PMC signal at output 212 is high, and is only asserted low in response to a cold boot event; the PCI reset signal at output 222 is normally high and the flush signal at output 214 is also normally high. This correlates to a high signal at input 218 of AND gate 216 and at input 226 of OR gate 224, a low signal at input 228 of OR gate 224, and a high signal at output 230 and input 220.

Immediately following a warm boot event, such as when a Ctrl-Alt-Delete interrupt is observed by the system read only memory (ROM), PMC 210 is instructed to assert the flush signal at output 214 (change it from high to low). This causes the input at input 226 of OR gate 224 to go low, and because of delay device 238 the input at input 228 or OR gate 224 is delayed from going from low to high. This causes the signal at output 230 of OR gate 224 to become low. AND gate 216 now has a high signal at input 218 and a low signal 220, thereby causing the PCI reset signal at output 220 to be asserted (change from high to low) and resetting PCI bus 120.

As capacitor 242 charges up, the signal at input 228 switches from low to high causing the signal at output 230 to switch back high, which in turn releases the PCI reset signal (goes from low to high) thereby allowing the system to restart.

When using the Intel 440FX PCIset, good results have been achieved in the present invention by configuring delay device 238 to provide an approximate 8 millisecond delay. This is achieved by using a 100 Kohm resistor for resistor 240 and a 0.22 microfarad capacitor for capacitor 242.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A computer system comprising;
   a first and a second data bus;
   a data bridge connected between said first bus and said second bus, said data bridge for interfacing data between said first bus and said second bus;
   a reset connected between said data bridge and said second bus, said reset for resetting the second bus;
   said reset including an AND gate having first and second inputs and an output, said first input connected to said data bridge and said output connected to said second data bus; and
   said reset further including an inverter and a delay device with said delay device connected between said inverter and said AND gate.

2. The computer system as recited in claim 1, wherein said second data bus is a peripheral component interconnect (PCI) bus.

3. The computer system as recited in claim 1, wherein said data bridge is a peripheral component interconnect (PCI) bridge.

4. The computer system as recited in claim 3, wherein said PCI bridge includes a PCI/memory controller (PMC).

5. The computer system as recited in claim 1, wherein said reset includes an OR gate having first and second inputs and an output, said output of said OR gate connected to said second input of said AND gate and said first input of said OR gate connected to said data bridge.

6. The computer system as recited in claim 5, wherein said reset includes an inverter having an input and an output, said input of said inverter connected to said data bridge.

7. The computer system as recited in claim 6, wherein said reset includes a delay device connected between said output of said inverter and said second input of said OR gate.

8. The computer system as recited in claim 7, wherein said delay includes a resistor connected between said output of said inverter and said second input of said OR gate.

9. The computer system as recited in claim 8, wherein said delay includes a capacitor connected between a first potential and said second input of said OR gate.

10. A system including a reset circuit connected between a peripheral component interconnect (PCI) bus and a PCI/memory controller (PMC) for resetting the PCI bus, said reset comprising:
    an AND gate having first and second inputs and an output, said first input connected to said PMC, and said output connected to said PCI bus;
    an OR gate having first and second inputs and an output, said output of said OR gate connected to said second input of said AND gate, and said first input of said OR gate connected to said PMC;
    an inverter having an input and an output, said input of said inverter connected to said PMC; and
    a delay device connected between said output of said inverter and said second input of said OR gate.

11. The system as recited in claim 10, wherein said input of said inverter is connected to said first input of said OR gate.

12. The system as recited in claim 10, wherein said delay device includes a resistor connected between said output of said inverter and said second input of said OR gate.

13. The system as recited in claim 10, wherein said delay device includes a capacitor connected between said second input of said OR gate and a first potential.

14. A computer system comprising:
    a host data bus;
    a peripheral component interconnect (PCI) data bus;
    a PCI host bridge connected between said host data bus and said PCI data bus, said PCI host bridge for interfacing data between said host data bus and said PCI data, said PCI host bridge including a PCI/memory controller (PMC), said PMC including a first output for outputting a first reset signal, and said PMC including a second output for outputting a second rest signal; and
    a reset connected between said PCI host bridge and said PCI data bus, said reset for resetting said PCI data bus; said reset including an AND gate having first and second inputs and an output, said first input connected to said first output of said PMC for receiving said first reset signal, said first output of said AND gate connected to said PCI bus, and said reset including and OR gate having first and second inputs and an output, said output of said OR gate connected to said second input of said AND gate and said first input of said OR gate connected to said second output of said PMC for receiving said second reset signal.

15. The computer system as recited in claim 14, wherein said PMC is an Intel Model 8244FX PMC.

16. The computer system as recited in claim 14, wherein said reset includes:

an inverter having an input and an output, said input of said inverter connected to said second output of said PMC for receiving said second reset signal; and a delay connected between said output of said inverter and said second input of said OR gate.

17. The computer system as recited in claim 16, wherein said delay includes a resistor connected between said output of said inverter and said second input of said OR gate, and said delay includes a capacitor connected between a first potential and said second input of said OR gate.

* * * * *